(12) United States Patent
Thario (10) Patent No.: US 8,973,134 B2
(45) Date of Patent: Mar. 3, 2015

(54) SOFTWARE VULNERABILITY NOTIFICATION VIA ICON DECORATIONS

(71) Applicant: International Business Machines Corporation, Armonk, NY (US)

(72) Inventor: James E. Thario, Honolulu, HI (US)

(73) Assignee: International Business Machines Corporation, Armonk, NY (US)

(*) Notice: Subject to any disclaimer, the term of this patent is extended or adjusted under 35 U.S.C. 154(b) by 30 days.

(21) Appl. No.: 13/893,483

(22) Filed: May 14, 2013

(65) Prior Publication Data

US 2014/0344936 A1 Nov. 20, 2014

(51) Int. Cl.
*G06F 11/00* (2006.01)
*G06F 21/57* (2013.01)

(52) U.S. Cl.
CPC .................................. *G06F 21/577* (2013.01)
USPC ............................................... 726/22; 726/25

(58) Field of Classification Search
CPC ............ H04L 63/1416; H04L 63/1425; H04L 63/1441; H04L 63/1466; H04L 63/20; G06F 21/577
USPC .................. 726/11–14, 22–26; 713/150–154; 709/223–225
See application file for complete search history.

(56) References Cited

U.S. PATENT DOCUMENTS

| 6,282,709 | B1 | 8/2001 | Reha et al. |
| 6,353,926 | B1 | 3/2002 | Parthesarathy et al. |
| 6,535,227 | B1* | 3/2003 | Fox et al. ...................... 715/736 |
| 6,883,101 | B1* | 4/2005 | Fox et al. ........................ 726/25 |
| 7,143,439 | B2* | 11/2006 | Cooper et al. ................... 726/11 |
| 7,945,958 | B2* | 5/2011 | Amarasinghe et al. ......... 726/25 |
| 8,135,392 | B2 | 3/2012 | Marcellino et al. |
| 2007/0067847 | A1 | 3/2007 | Wiemer et al. |
| 2008/0271151 | A1 | 10/2008 | Blake et al. |
| 2009/0083695 | A1* | 3/2009 | Mir et al. ...................... 717/104 |
| 2009/0282457 | A1 | 11/2009 | Govindavajhala |

OTHER PUBLICATIONS

Ager et al., "New indicators of vulnerability and adaptive capacity"; Tyndall Centre for Climate Change Research; Technical Report 7; Jan. 2004.
"WOT web of trust"; Safe Browsing Tool—WOT (Web of Trust); Copyright 2013 WOT Services; Printed Feb. 20, 2013; <http://www.mywot.com>.

* cited by examiner

*Primary Examiner* — Hosuk Song
(74) *Attorney, Agent, or Firm* — Stephen Darrow; Abdul-Samad Adediran; John R. Pivnichny (57) ABSTRACT

A computer identifies computer software applications installed on a computer. The computer sends an electronic request to a program on a server computer that extracts information about the computer software applications identified having a vulnerability. The computer receives the information that is extracted. The computer generates an icon decoration for the vulnerability, wherein the icon decoration readily displays the level of risk associated to the vulnerability and information about a security update for the vulnerability. The computer adds the icon decoration onto each icon of the one of the computer software applications identified and each icon of electronic documents associated to the one of the computer software applications identified.

3 Claims, 5 Drawing Sheets

FIG. 4

SOFTWARE VULNERABILITY NOTIFICATION VIA ICON DECORATIONS

BACKGROUND

1. Field of the Invention

The present invention relates generally to icon decorations, and more particularly to generating an icon decoration that can readily notify an end-user about a vulnerability associated to a computer software application.

2. Description of the Related Art

In consumer computing, it is known to apply security updates (i.e., security patch) for computer software applications via an automated computer software system or a manual process performed by an end-user of the computer software applications. In addition, it is known for a third-party application program to manage the security updates separately from operating system software updates, wherein third-party application program vendors can each have their own unique solutions to check and apply the security updates to their application program.

Computer software applications having vulnerabilities are increasingly becoming a path through which a hacker, via malware, can gain unauthorized access to a computer in order to deliver a malicious payload. To minimize vulnerabilities of a computer software application and unauthorized access to the computer software application, the security updates and security update verifications can be typically performed from within the computer software application. However, there may be risk in launching a vulnerable computer software application to perform a security update or to determine if an update is necessary. For example, computer software applications that load previously used content or dynamically loaded content from an external source, during launch of the computer software application, may need to be updated before being used. Additionally, dormant malware embedded in local or remotely loaded content may only be activated on specific versions of a computer software application. Furthermore, functionality for accessing security update information for a computer software application having vulnerabilities may be outside the path of normal usage of the computer software application, and as a result an end-user of the computer software application may not be aware of an available security update for the computer software application. Moreover, even if the end-user becomes aware of the available security update for the computer software application, the end-user may not be readily aware of the risk associated with launching the computer software application in order to apply the security update.

SUMMARY

Aspects of an embodiment of the present invention disclose a method, computer system, and program product for generating an icon decoration that readily notifies an end-user about a vulnerability associated to a computer software application. A computer identifies computer software applications installed on the computer. The computer sends an electronic request to a program on a server computer that extracts information, from a database, about the computer software applications identified, wherein the information includes at least a vulnerability of one of the computer software applications identified, a level of risk associated to the vulnerability, and information about at least one of a security patch for the one of the computer software applications identified and instructions to configure the one of the computer software applications identified in order to minimize the level of security risk associated to the vulnerability. The computer receives the information that is extracted from the database. The computer generates an icon decoration for the vulnerability, wherein the icon decoration readily displays the information that is extracted. The computer adds the icon decoration onto each icon of the one of the computer software applications identified and each icon of electronic documents associated to the one of the computer software applications identified.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a software vulnerability icon decoration program having program code for generating an icon decoration that can readily notify an end-user about a vulnerability associated to a computer software application. The term vulnerability as used hereinafter refers to an unspecified result or an unexpected condition that can include a path through which a person (e.g., a computer hacker) can gain unauthorized access to a computer in order to trigger and/or exploit the result or condition. The unauthorized access typically is in violation of a computer software security policy that is setup to protect the computer from malicious cyber attacks.

Figure 1:
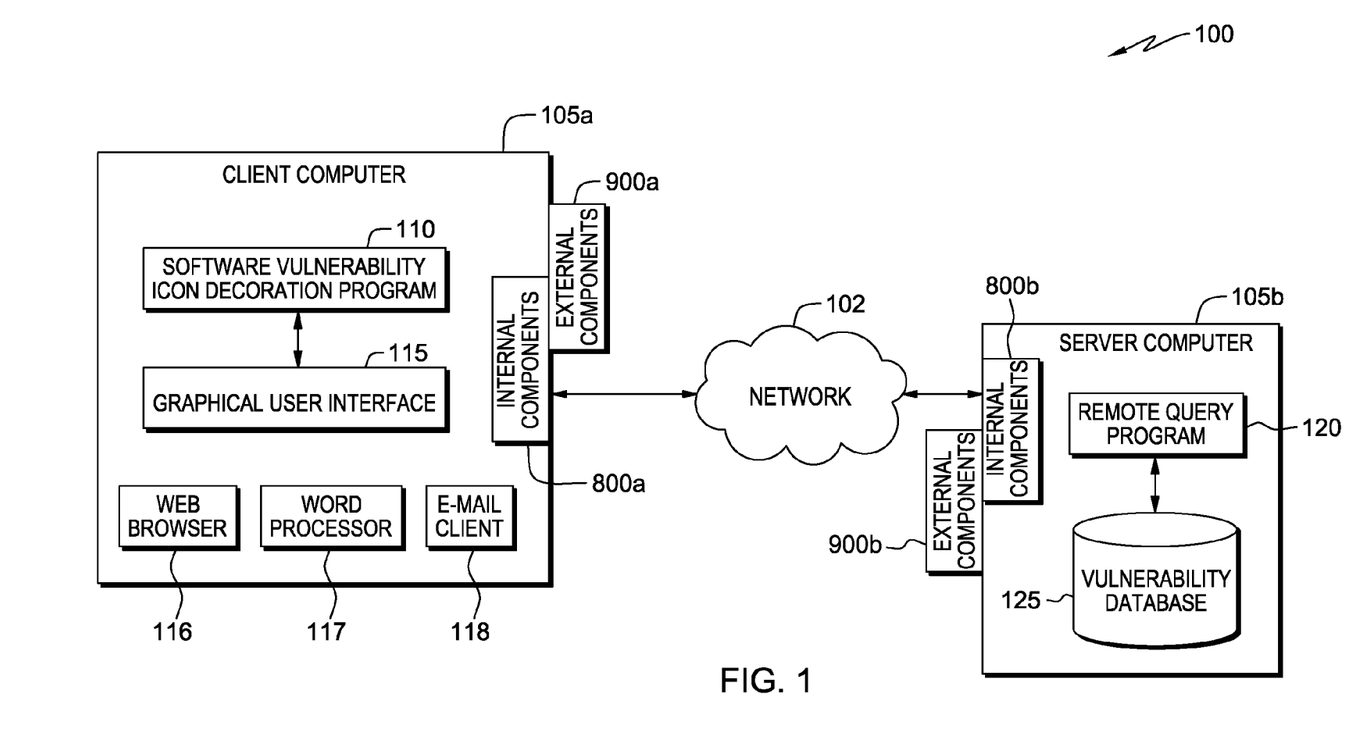
FIG. 1 is a block diagram of a distributed computer system, including a client computer having an icon decoration generation program that interacts with a graphical user interface having icons and utilizes information received from a remote query service, on a server computer, to generate an icon decoration to add to one or more of the icons, wherein the icon decoration can readily notify an end-user about a vulnerability associated to a computer software application installed on the client computer according to an embodiment of the present invention.

FIG. 1 illustrates computer system 100 that includes network 102, client computer computer 105a having software vulnerability icon decoration program 110 that interacts with graphical user interface 115 of computer 105a, and server computer 105b having remote query program 120 installed. In addition, in the disclosed embodiment, client computer 105a has computer software applications installed, wherein the computer software applications include the following: web browser 116, word processor 117, and e-mail client 118. Web browser 116 includes any computer software application (e.g., Windows® Internet Explorer® web browser available from Microsoft Corporation of Redmond, Wash., USA, or Firefox® web browser available from the Mozilla Foundation of Mountain View, Calif., USA) that sends HTTP requests through network 102 for web page documents (e.g., HTML documents), and interprets and renders the web page documents for display to the end-user. Word processor 117 includes any computer software application that can be used for editing plain text. Moreover, e-mail client 118 includes any computer software application that can be utilized to send, receive, and display an e-mail message.

Moreover, in the disclosed embodiment, server computer 105b includes vulnerability database 125 for storing information about computer software applications, wherein the information includes the following: names of computer software applications, a unique identifier (unique ID) (e.g., version number) associated to each of the names of computer software applications, vulnerabilities identified that are associated with the unique ID, severity level parameter value assigned to each of the vulnerabilities identified based on amount of security risk, and a list of security updates (i.e., security patches) for each of the vulnerabilities identified. In addition, client computer 105a and server computer 105b each include respective internal components 800a and 800b, and respective external components 900a and 900b, as described below in more detail with respect to FIG. 4.

Software vulnerability icon decoration program 110 is program code that sends a request to remote query program 120 to retrieve information, mentioned above that is within vulnerability database 125, about computer software applications installed on client computer 105*a*. In response to receiving the request from the program code, remote query program 120 extracts the information, from vulnerability database 125, about the computer software applications installed on client computer 105*a*. Specifically, to extract the information remote query program queries vulnerability database 125 for the information. Subsequent to extracting the information, remote query program sends the information to software vulnerability icon decoration program 110. Software vulnerability icon decoration program 110 can utilize the information received to generate an icon decoration that can readily notify an end-user about a vulnerability associated to a computer software application. Thus, the icon decoration generated is appended (i.e., added) onto each icon associated to the computer software application (e.g., an icon for launching the computer software application and any other icons for electronic documents generated by and/or viewable by the computer software application). In addition, the icon decoration can be customized to have an electronic image with various shapes and colors based on needs of the end-user, wherein an icon decoration that is customize can further readily notify the end-user about the level of computer security risks associated to a vulnerability of the computer software application.

Figure 2A:
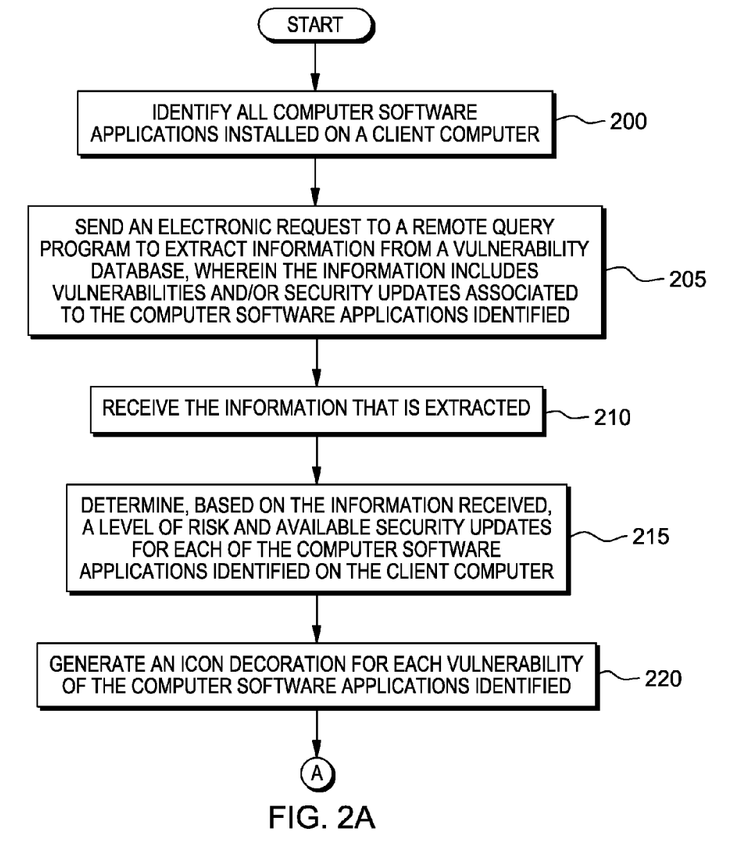
FIGS. 2A and 2B are flowcharts illustrating operations of the icon decoration generation program interacting with a remote query program to generate the icon decoration according to an embodiment of the present invention.
Figure 2B:
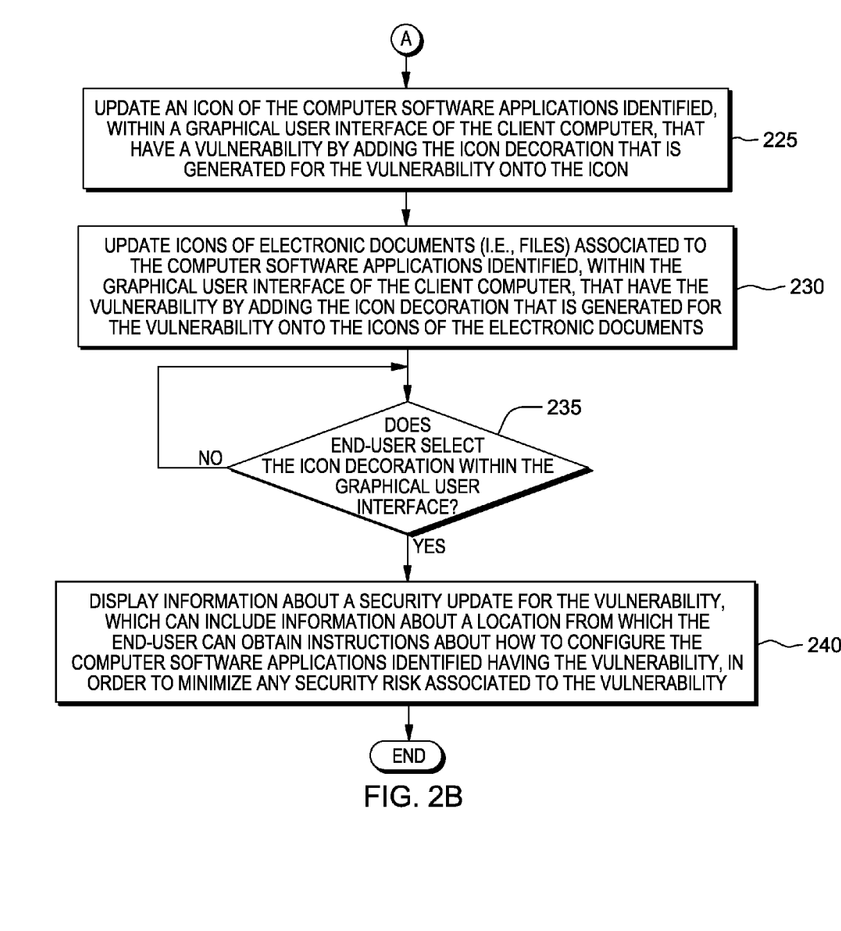

FIGS. 2A and 2B are flowcharts illustrating the steps of the program code of software vulnerability icon decoration program 110 in more detail. The program code identifies all computer software applications installed on client computer 105*a* (block 200). A system programmer/administrator can configure a schedule to instruct the program code how frequently to search the computer file system of client computer 105*a* in order to identify the computer software applications installed on client computer 105*a*. For example, the system programmer/administrator can configure the schedule to instruct the program code to run the search of the computer file system of client computer 105*a* on an hourly or a daily basis for installed computer software applications that have not been previously identified by the program code. Thus, in the disclosed embodiment, the program code identifies that web browser 116, word processor 117, and e-mail client 118 are installed on client computer 105*a*.

Next, the program code sends an electronic request to remote query program 120 to extract information from vulnerability database 125, wherein the information includes vulnerabilities and/or security updates associated to the computer software applications identified (block 205). Specifically, the electronic request includes a name parameter for each of the computer software applications identified, and a unique ID (e.g., software version number) parameter associated to each name. In particular, remote query program 120 utilizes the name parameter and the unique ID parameter to generate a query that can lookup and extract the information about the computer software applications identified. Thus, in response to receiving the request, remote query program 120 sends the query to vulnerability database 125, which extracts, from vulnerability database 125, information about computer software applications identified.

The information that is extracted by remote query program 120 can include the following: names of computer software applications, a unique ID (e.g., version number) associated to each of the names of computer software applications, vulnerabilities identified that are associated with the unique ID, severity level parameter value assigned to each of the vulnerabilities identified, and a list of security updates for each of the vulnerabilities identified.

Furthermore, the security level parameter value, mentioned above, that is assigned to a vulnerability identified can be configured by a system programmer/administrator, wherein the security level parameter value indicates a level of security risk (i.e., a level of severity) associated with utilizing a computer software application having the vulnerability identified. In the disclosed embodiment, the security level parameter value can have a value that ranges from zero to ten, wherein zero represents the lowest level of security risk and ten represents the highest level of security risk. However, in other embodiments the range can be different. Subsequently, remote query program 120 sends the information that is extracted to the program code on client computer 105*a*.

Next, the program code receives the information that is extracted (block 210), and determines, based on the information received, a level of risk and available security updates for each of the computer software applications identified on client computer 105*a* (block 215). Subsequently, the program code generates an icon decoration for each vulnerability of the computer software applications identified (block 220). Thus, the program code does not generate an icon decoration for the computer software applications identified that do not have a vulnerability. Specifically, in the disclosed embodiment, the program code generates an electronic image of the icon decoration for each vulnerability of the computer software applications identified, wherein the electronic image is selected based on the security level parameter value (i.e., level of risk associated to the vulnerability) within the information received. The icon decoration having the electronic image that is generated can readily notify an end-user of client computer 105*a* about the level of security risk associated with a vulnerability, wherein the electronic image that provides contextual information and alert the end-user about the security risk (e.g., indication of severity level of the vulnerability and/or indication of whether a security update is available) without having to open (i.e., launch) a computer software application and/or electronic documents (i.e., files) having the vulnerability.

Furthermore, by not having to open the computer software application to apply a security update, an end-user may avoid any security risk (e.g., data loss) associated to the vulnerability that can result from opening the computer software application and/or an electronic document associated to the computer software application. Moreover, an end-user of client computer 105*a* can apply graphical customizations to the electronic image of the icon decoration that is generated in order to be further visually notified of the level of a security risk associated with a vulnerability. For example, the graphical customizations can include the following: a biohazard symbol, a radioactive symbol, a warning arrow, or any other symbol that is visually meaningful to an end-user.

Next, the program code updates an icon of the computer software applications identified, within graphical user interface 115 of client computer 105*a*, that have a vulnerability by adding the icon decoration that is generated for the vulnerability onto the icon (block 225). In addition, the program code updates icons of electronic documents (i.e., files) associated to the computer software applications identified, within graphical user interface 115 of client computer 105*a*, that have the vulnerability by adding the icon decoration that is generated for the vulnerability onto the icons of the electronic documents (block 230). Subsequently, the program code checks if an end-user selects the icon decoration within graphical user interface 115 (decision block 235). If an end-user selects the icon decoration within graphical user interface 115 (the "YES" branch of decision block 235), then the program code displays information about a security update for the vulnerability (e.g., configuration information to resolve the vulnerability), which can include information about a location from which the end-user can obtain instructions about how to configure (e.g., manually configure) the computer software applications identified having the vulnerability, in order to minimize any security risk associated to the vulnerability (block 240). Subsequent to displaying the information the program code ends. Otherwise, if an end-user does not select the icon decoration within graphical user interface 115 (the "NO" branch of decision block 235), then program code continues to check if an end-user selects the icon decoration on client computer 105a (decision block 235).

As a result, by adding the icon decorations that are generated onto icons of the computer software applications identified and onto the icons of the electronic documents associated to the computer software applications identified, the icon decorations are readily displayed and viewable via graphical user interface 115. Thus, an end-user can be easily notified of a security risks associated with utilizing the computer software application identified, wherein the security risks can result in unauthorized access, use, and/or destruction of data on client computer 105a. Moreover, if a computer software application identified has multiple vulnerabilities, then the icon decoration generated for one of the vulnerabilities with the highest level of security risk is added onto the icon of the computer software application identified and onto icons of electronic documents associated to the computer software application identified. Accordingly, if there are multiple icon decorations to add onto an icon, then the program code will display on the icon the icon decorations with the highest level of security risk associated with utilizing a computer software application identified having multiple vulnerabilities. However, the icon decorations with lower level security risk will be added onto the icon subsequent to security updates being applied to resolve the multiple vulnerabilities associated to the icon decorations with the highest level of security risk. Thus, icon decorations are added to and displayed on icons within graphical user interface 115, based on level of security risk (i.e., a level of severity).

Figure 3:
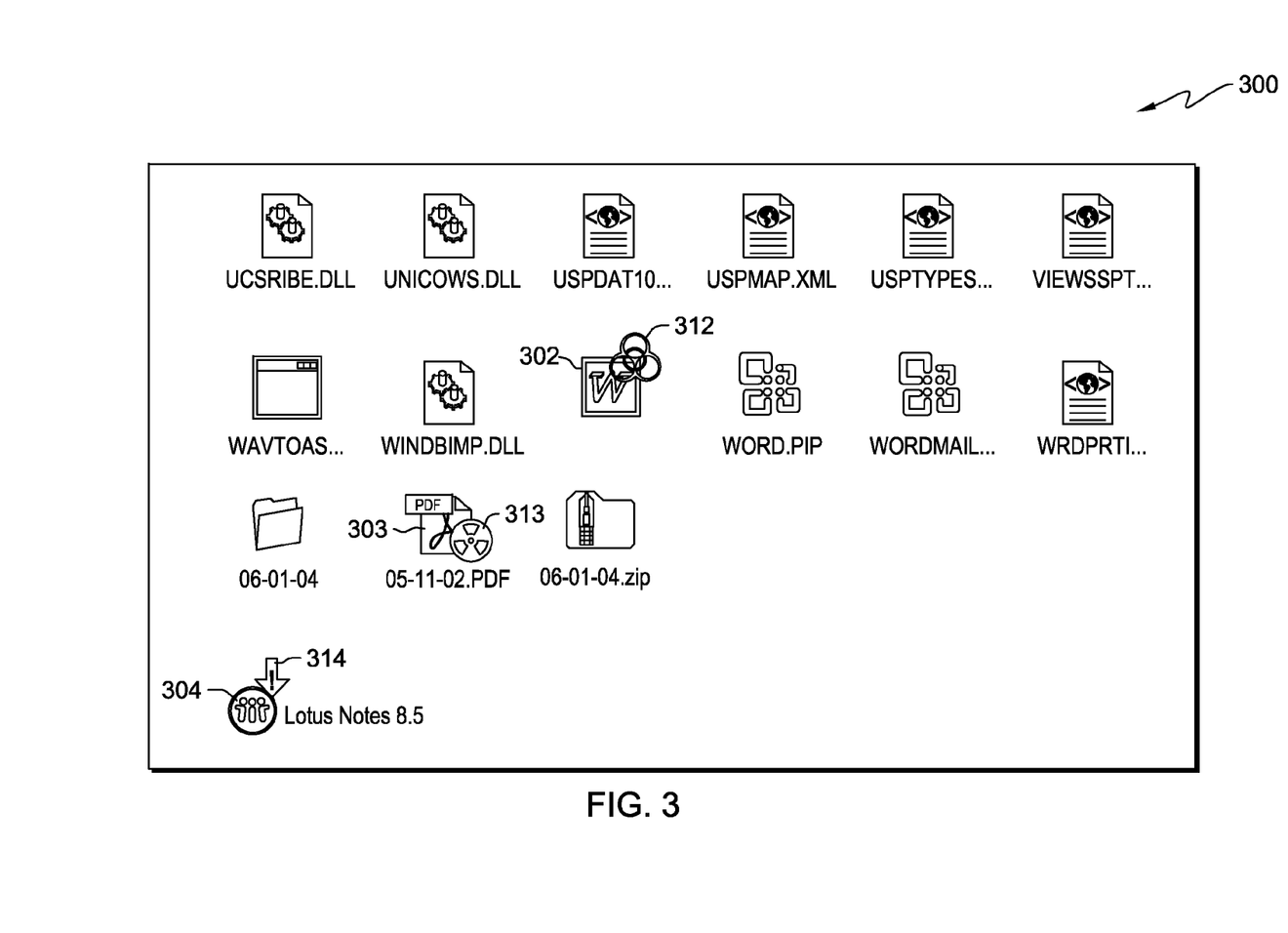
FIG. 3 is a display screen of the client computer illustrating the graphical user interface of the client computer, wherein the icons of graphical user interface have icon decorations generated by the icon decoration generation program according to an embodiment of the present invention.

FIG. 3 is a display screen 300 of client computer 105a illustrating graphical user interface 115 of client computer 105a, wherein graphical user interface 115 includes icons 302-304 with respective icon decorations 312-314 generated by software vulnerability icon decoration program 110. Specifically, icon 302 includes icon decoration 312 represented by an electronic image of a biohazard symbol, icon decoration 303 includes icon decoration 313 represented by an electronic image of a radioactive symbol, and icon decoration 304 includes icon decoration 314 represented by an electronic image of a warning arrow. Thus, in the disclosed embodiment, each icon decoration can be represented by symbols to readily notify an end-user of security risks associated to a vulnerability of one or more computer software applications identified on client computer 105a.

Figure 4:
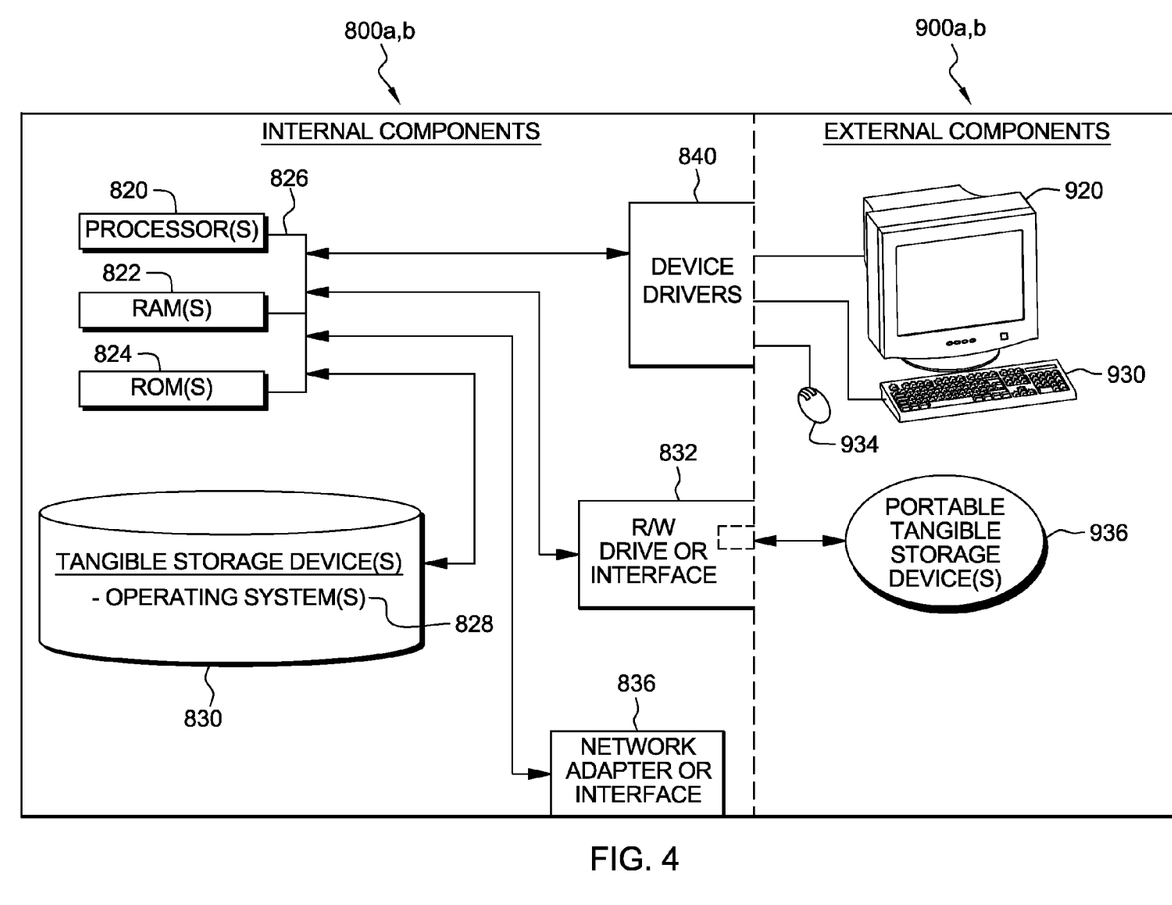
FIG. 4 is a block diagram depicting internal and external components of the client computer and the server computer of FIG. 1 according to an embodiment of the present invention.

FIG. 4 is a block diagram depicting a set of internal components 800a and a set of external components 900a that correspond to client computer 105a, as well as a set of internal components 800b and a set of external components 900b that correspond to server computer 105b. Internal components 800a and 800b each include one or more processors 820, one or more computer readable RAMs 822, one or more computer readable ROMs 824 on one or more buses 826, and one or more operating systems 828 and one or more computer readable tangible storage devices 830. The one or more operating systems 828 and software vulnerability icon decoration program 110 on client computer 105a is stored on one or more of the respective computer readable tangible storage devices 830 for execution by one or more of the respective processors 820 via one or more of the respective RAMs 822 (which typically include cache memory). In the embodiment illustrated in FIG. 4, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Software vulnerability icon decoration program 110 on client computer 105a can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Software vulnerability icon decoration program 110 on client computer 105a can be downloaded to respective computer 105b from an external computer or external storage device via a network (for example, the Internet, a LAN, or a WAN) and respective network adapters or interfaces 836. From the network adapter or interface 836, software vulnerability icon decoration program 110 on client computer 105a are loaded into respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 4 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of an embodiment of the invention may be written in any combination of one or more programming languages, including an object oriented programming language such as JAVA, Smalltalk, C++ or the like and conventional procedural programming languages, such as the "C" programming language or similar programming languages. The program code may execute entirely on the end-user's computer, partly on the end-user's computer, as a stand-alone software package, partly on the end-user's computer and partly on a remote computer, or entirely on a remote computer or server. In the latter scenario, the remote computer may be connected to the end-user's computer through any type of network, including a LAN or WAN, or the connection may be made to an external computer (for example, through the Internet using an Internet Service Provider). Alternatively, the functions of the aforementioned programs can be implemented in whole or in part by computer circuits and other hardware (not shown).

Based on the foregoing, a method, computer system, and computer program product have been disclosed for generating an icon decoration that can readily notify an end-user about a vulnerability associated to a computer software application. However, numerous modifications and substitutions can be made without deviating from the scope of an embodiment of the invention. Therefore, one or more embodiments of the invention have been disclosed by way of example and not limitation.

What is claimed is:

1. A method for generating an icon decoration that readily notifies an end-user about a vulnerability associated to a computer software application, the method comprising the steps of:
    identifying computer software applications installed on a computer;
    sending an electronic request to a program on a server computer that extracts information, from a database, about the computer software applications identified, wherein the information includes at least a vulnerability of one of the computer software applications identified, a level of risk associated to the vulnerability, and information about at least one of a security patch for the one of the computer software applications identified and instructions to configure the one of the computer software applications identified in order to minimize the level of security risk associated to the vulnerability;
    receiving the information that is extracted from the database;
    generating an icon decoration for the vulnerability, wherein the icon decoration readily displays the information that is extracted; and
    adding the icon decoration onto each icon of the one of the computer software applications identified and each icon of electronic documents associated to the one of the computer software applications identified;
    wherein:
    the electronic request comprises a name parameter for the one of the computer software applications identified, and a unique identifier parameter associated to the name that are utilized by the program on the server computer to generate a query that extracts the information.

2. A computer program product for generating an icon decoration that readily notifies an end-user about a vulnerability associated to a computer software application, the computer program product comprising:
    a computer readable tangible storage device and program instructions stored on the computer readable tangible storage device, the program instructions include:
    program instructions to identifying computer software applications installed on a computer;
    program instructions to send an electronic request to a program on a server computer that extracts information, from a database, about the computer software applications identified, wherein the information includes at least a vulnerability of one of the computer software applications identified, a level of risk associated to the vulnerability, and information about at least one of a security patch for the one of the computer software applications identified and instructions to configure the one of the computer software applications identified in order to minimize the level of security risk associated to the vulnerability;
    program instructions to receive the information that is extracted from the database;
    program instructions to generate an icon decoration for the vulnerability, wherein the icon decoration readily displays the information that is extracted; and
    program instructions to add the icon decoration onto each icon of the one of the computer software applications identified and each icon of electronic documents associated to the one of the computer software applications identified;
    wherein:
    the electronic request comprises a name parameter for the one of the computer software applications identified, and a unique identifier parameter associated to the name that are utilized by the program on the server computer to generate a query that extracts the information.

3. A computer system for generating an icon decoration that readily notifies an end-user about a vulnerability associated to a computer software application, the computer system comprising:
    one or more processors, one or more computer readable memories, one or more computer readable storage media, and program instructions stored on the one or more storage media for execution by the one or more processors via the one or more memories, the program instructions comprising:
    program instructions to identifying computer software applications installed on a computer;
    program instructions to send an electronic request to a program on a server computer that extracts information, from a database, about the computer software applications identified, wherein the information includes at least a vulnerability of one of the computer software applications identified, a level of risk associated to the vulnerability, and information about at least one of a security patch for the one of the computer software applications identified and instructions to configure the one of the computer software applications identified in order to minimize the level of security risk associated to the vulnerability;
    program instructions to receive the information that is extracted from the database;
    program instructions to generate an icon decoration for the vulnerability, wherein the icon decoration readily displays the information that is extracted; and
    program instructions to add the icon decoration onto each icon of the one of the computer software applications identified and each icon of electronic documents associated to the one of the computer software applications identified;
wherein:
the electronic request comprises a name parameter for the one of the computer software applications identified, and a unique identifier parameter associated to the name that are utilized by the program on the server computer to generate a query that extracts the information.

* * * * *